May 3, 1966   A. J. VOGL ETAL   3,249,134
SAW AND DADO GUARD

Filed Jan. 30, 1964   2 Sheets-Sheet 1

INVENTORS
Alexander J. Vogl
William B. Boice
BY John F. Brezina
Their ATTORNEY

May 3, 1966  A. J. VOGL ETAL  3,249,134
SAW AND DADO GUARD
Filed Jan. 30, 1964  2 Sheets-Sheet 2
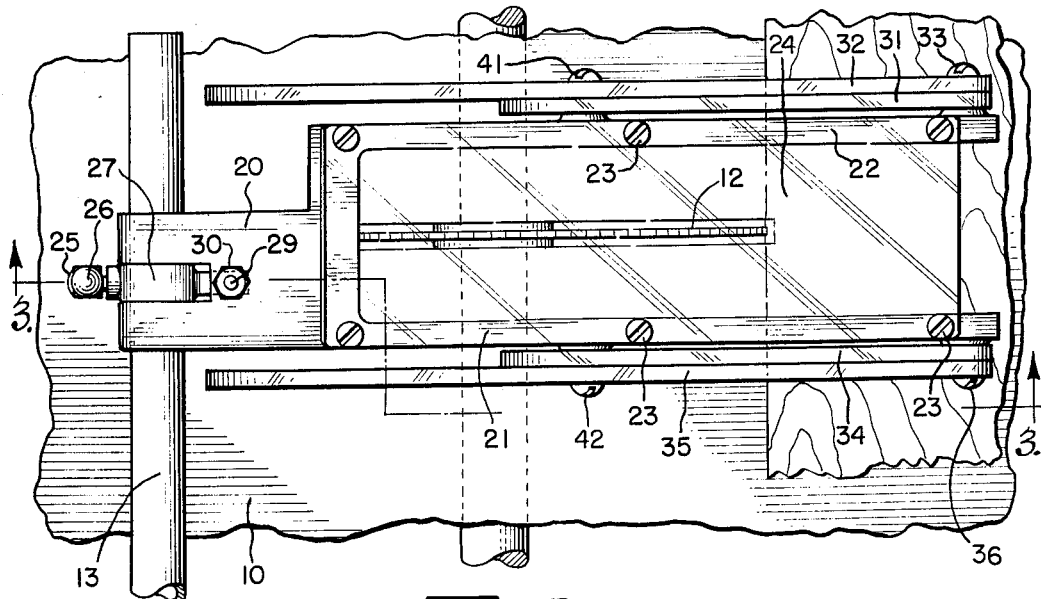
FIG. 2
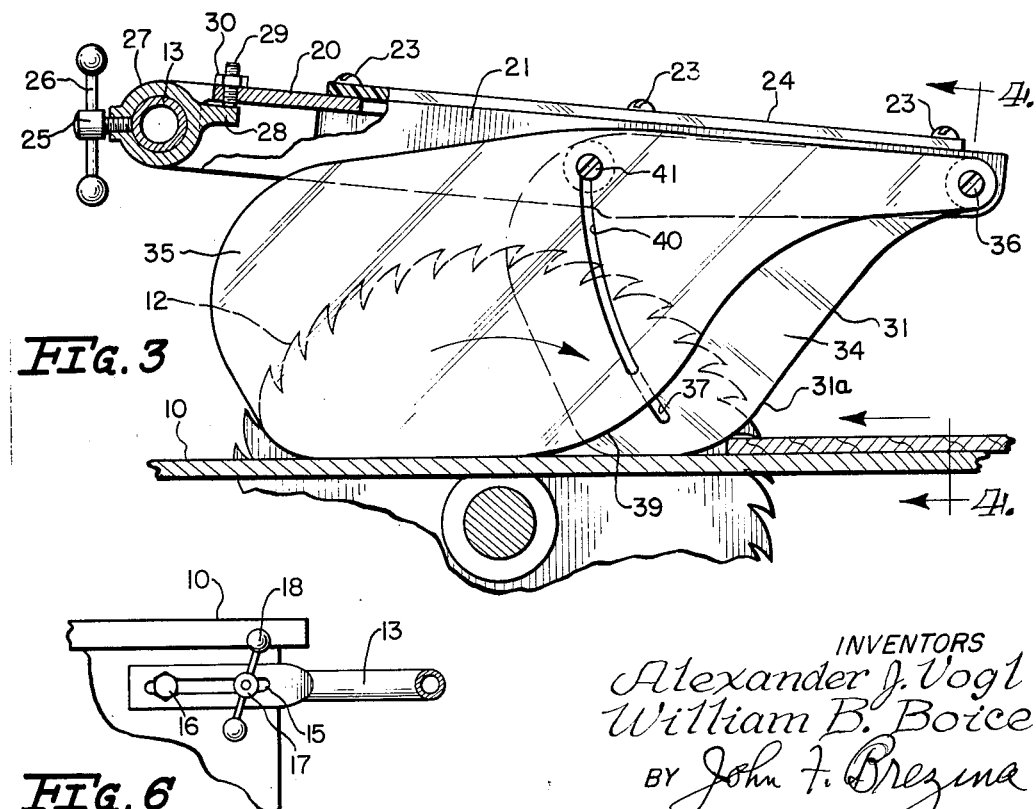
FIG. 3
FIG. 6
INVENTORS
Alexander J. Vogl
William B. Boice
BY John F. Brezina
Their ATTORNEY

United States Patent Office 3,249,134
Patented May 3, 1966

3,249,134
SAW AND DADO GUARD
Alexander J. Vogl, Glenview, Ill., and William B. Boice, Toledo, Ohio, assignors to Wilton Corporation, Schiller Park, Ill., a corporation of Illinois
Filed Jan. 30, 1964, Ser. No. 341,453
8 Claims. (Cl. 143—159)

This invention is directed to novel guards for power driven saws, dadoes and other driven cutters which are adapted for cutting, grooving, or other work upon various types of work pieces which may be of wood, plastic, metal, or of other materials.

Presently known saw guards are comprised of adjustably mounted rigid single piece hoods or baskets which normally rest over the upper portion of a circular saw and which are pivotally connected to a stationary part of the saw bed so as to be elevated either by pushing movement of a work piece against their lower portions or manually, to provide a protective shield against hand contact with a rotating saw blade during only a part of the period of time when the work piece is being moved into engagement with a rotating blade. Most such guards are of rigid one piece construction, and are completely raised above the table by sliding engagement of the work piece with their beveled end portion so that there is a space into which a user may push his hand (as his hand holds the end of the work piece) with resulting serious injury. Further, the presently known one piece guards, when partially raised, do not prevent the outward flying of wood chips and sawdust which often strike users' eyes and affect their vision temporarily.

Additionally, presently known guards are made principally of metal and these obstruct substantial parts of the work pieces during the cuting and sawing operation so that users, especially students, will not properly guide the work pieces during sawing operations.

Important objects of our invention are:

(a) To provide a novel guard for power saws and dado cutters which consists of two or more transparent shields or guards pivotally mounted at one end of each thereof relative to a supporting means which is adjustably supported above the saws or cutters, and wherein the rearward guards are transparent and are relatively shorter than the foremost guards and will pivot downward by gravity when work pieces pass and disengage said rearward guards to thereby fully obstruct accidental hand access to such saws or cutters, and wherein the longer adjacent shields or guards are transparent and will be partially raised by the work pieces and shield manual access to the saws from adjacent side areas as the work pieces are pushed forward in the cutting operations.

(b) To provide a plurality of pivotally supported transparent guards in different forward and rearward positions, and partially overlapping, supported on an adjustably mounted arm over the cutting area, wherein two transparent beveled shields of different lengths are pivoted on each side of such supporting arm so that the front shields are slidably engaged and pivoted upwardly by work pieces and which will drop to lowermost fully protecting position when the work pieces are pushed past the movable end portion of said shorter front shields; the longer rearward shields being of novel construction so that same will normally rest on the work pieces as the latter are pushed through the cutting operation and simultaneously shield manual access to the rotating cutting element and also prevent outward projection and flying of chips and sawdust to avoid affecting the operator's full vision of the work pieces during the cutting operation, said shorter shields also preventing vision-obstructing projection of chips and dust.

(c) To provide a novel adjustable guarding device and mounting means for same which will substantially enclose the rotating saw or cutters from above and from both sides thereof, which includes a transparent shorter shield and a longer transparent shield pivoted on each side of the cutting element, the said shorter shield being adapted to drop into lowermost position on the work bed during the times when the longer shield is held upraised by work pieces so as to provide an effective obstruction to movement of an operator's hand toward the cutting element while the cutting operation is in progress.

(d) To provide an adjustably mounted transparent guard, and adjustable holding means for same for use on driven saws and cutters which provide complete visibility of work pieces and saws to the operator during the entire work operations, and which have a pair of forward pivoted transparent shields pivotally mounted forward and on opposite sides of the cutting element, and having a second pair of longer transparent shields pivoted forward of the cutting element, the said forward shields being relatively shorter than the said pair of longer shields, to provide for dropping of said forward shield to obstructing positions upon a work bed immediately after disengagement of the work pieces from said forward shields, the longer transparent shields acting to guard access to a driven cutting element during the entire cutting operation.

Other and further important objects of our invention will be apparent from the following description and appended claims.

On the drawings:

FIG. 2 is a enlarged top view looking at the upper portion of one of said guards adjustably mounted upon a broken off portion of the supporting bracket.

FIG. 3 is a side elevational view, with parts in cross section, illustrating two of the panel-like side guards in normally lowered position before engagement by a work piece to be cut, and illustrating a part of the supporting bracket in cross section.

FIG. 6 is an enlarged fragmentary and elevational view of the lower connecting portion of the angularly bent mounting bracket illustrating the adjustable means for securing the end portion of said bracket relative to the rear portion of a supporting table or the like.

As shown on the drawings:

Figure 1:
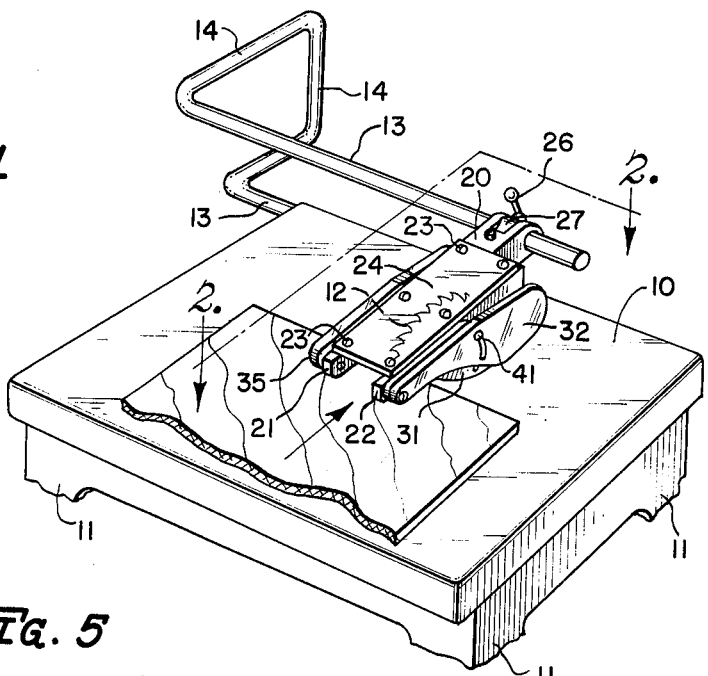
FIG. 1 is an elevational view, with parts broken away, illustrating the upper bed portion of a bench saw having one of our novel guards adjustably mounted over the driven cutting member.

Numeral 10 designates a suitable normally horizontal table, work bed or bench suitably supported relative to a floor by means of a plurality of legs 11 which are illustrated in FIG. 1 as partially broken away. Mounted to project through a suitable slot (not shown), is a driven circular saw 12 which is illustrative of varying types of cutting elements and which are suitably mounted on power driven shafts or arbors (not shown), and which are operatively connected to suitable prime movers (not shown), such as electric motors or the like.

Reference numeral 13 is a metal angularly bent supporting and mounting bracket which is preferably made from steel tubing or pipe, and which has its intermediate portion 14 of substantially U-shaped form and bent rearwardly, thence upwardly and horizontally to normally position its free end a short distance above the rear portion of the work bed or table 10 and to avoid obstructing wide work pieces on the machine. The lower end portion of the bracket 13 is preferably enlarged and provided with a horizontal slot 15, to provide releasable and adjustable means for anchoring and securing said bracket to the rear portion of a supporting table 10 by means of a screw 16 and a threaded screw 17 which preferably has a slidable, grippable handle or pin 18 slidably mounted in a hole formed in the forward portion thereof, as illustrated in FIG. 6. It will be understood that said bracket may be adjusted longitudinally or transversely by means of releasing and sliding its said lower slotted portion relative to the bolt 16 and screw 17 when the latter are released and then re-tightening said bolt and said screw, this to selectively position the upper free end of said bracket 13 above the middle portions of power saws and work beds of varying sizes.

Figure 4:
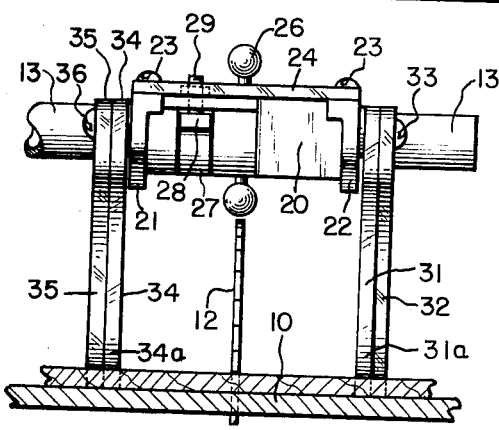
FIG. 4 is an elevational view, with parts broken away, taken on a vertical plane indicated by the line 4—4 of FIG. 3.

Reference numeral 20 designates the transversely passaged shank portion of a metal supporting arm which has a pair of outwardly projecting integral spaced apart arms or extensions 21 and 22, as indicated in FIG. 4. Said arms 21 and 22 have suitably secured thereon by means of threaded screws 23 a flat transparent panel 24 which extends substantially the full length of said projecting arms 21 and 22.

An annular metal collar 27 having an integral inwardly projecting lug 28 is slidably and adjustably mounted on the free end of the bracket 13, and said collar has a threaded passage formed therein in which is threadingly mounted a headed screw 25, said headed screw 25 being transversely passaged and having a grippable pin or handle 26 slidably mounted therein.

Threaded in arm 20 is a threaded adjusting screw 29 having a lock-nut 30 thereon, said screw 29 extending downward to contact lug 28. Lock-nut 30 is threaded on screw 29 as shown in FIG. 2. Said collar 27 is adapted to be loosened to selectively position the slidable arm 20 along the horizontally extending bracket 13, and the screw 25 is adapted to be tightened against the bracket 13 by rotation of the headed screw 25 with the aid of the slidable cross pin 26. The screw 29 is adapted to releasably hold the shank portion of arm 20 relative to the lug 28 so that the arm 20 is adjustably held at the desired height relative to the work table or bed and relative to the driven rotating saw or cutting members which latter vary in size.

Two separate panel-like shields 31 and 32, preferably formed of transparent material such as plastic, have formed in their normally adjacent reduced end portions a suitable hole whereby the said shields or guards 31 and 32 are pivotally secured at the reduced forward ends by means of a screw 33 which is threaded into a suitable threaded passage (not shown), in the free end portion of the metal extension or arm 22.

A substantially similar pair of elongated panel-like shields or guards 34 and 35, which are gradually reduced toward their end portions, have holes formed therein and which are loosely mounted on a pivoting screw 36, by means of which said panels are pivotally mounted in adjacent position and in substantially vertical planes adjacent the projecting arm 21, as indicated in FIGS. 2, 3 and 4.

Figure 5:
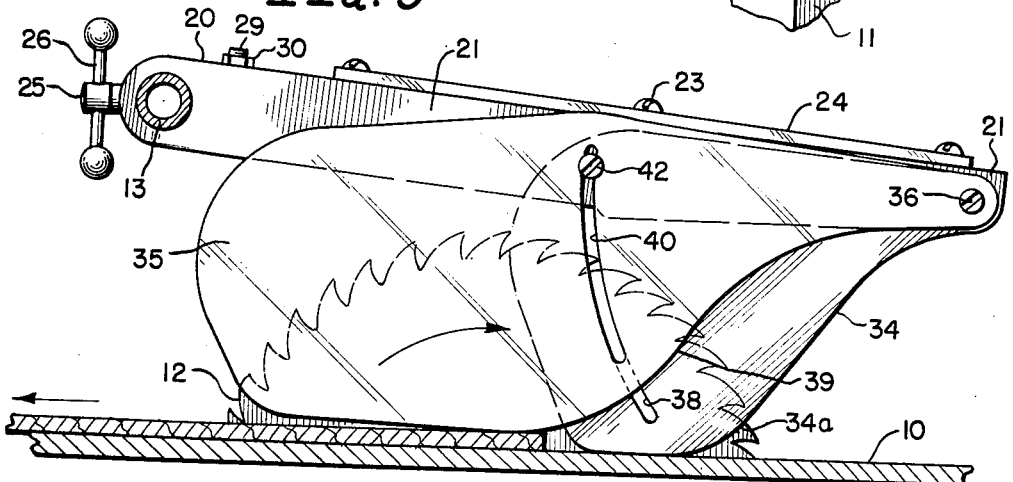
FIG. 5 is a side elevational view looking at one of our novel guards and illustrating the longer shield in a position partially elevated by a work piece on the table which has been moved along the work bed relative to a driven circular saw.

The two inner forward shields or guards 31 and 34 are relatively shorter and same have lower beveled edge portions 31a and 34a respectively, which are in forward positions to be first slidably engaged by work pieces moved upon and along the work bed toward the saw. As illustrated in the drawings, the rear portions of said forward shorter shields or guards are relatively wider than their pivoted portions, and the said shield 31 has formed therein an arcuate slot 37 concentric with the pivoting screw 33. Said second forward shorter shield or guard 34 has an arcuate slot 38 formed therein concentric with the pivoting screw 36, as indicated in FIGS. 2 and 5 respectively.

The longer panel-like shields or guards 32 and 35 have their forward edges 39 beveled as indicated and their main portions are substantially wider than their forward pivoted end portions respectively. The intermediate portions of said outer longer shields or guards 32 and 35 have formed therein arcuate slots 40 which are concentric with the pivot screws 33 and 36 respectively, and which register with the arcuate slots 37 and 38 when said guards are in adjacent position. A threaded retaining and guide screw 41 extends through the adjacent arcuate slots of guards 31 and 32 and threads into a threaded hole in the extension arm 22, as indicated in FIGS. 1 and 2. Another threaded guide screw 42 is mounted to extend through the adjacent arcuate slots of shields 34 and 35 and is threaded into a threaded hole in the extension or arm 21, as indicated in FIG. 4.

Said screws 41 and 42 are not tightened but are mounted so that the said respective panel-like shields and guards will loosely pivot and be free for upward movement and for downward gravity movement to permit said guards to rest upon the work pieces being moved in engagement with their lower edges and to drop by gravity upon the flat work bed when work pieces have passed beyond engaging positions thereof. Said guide screws 41 and 42, in cooperation with the said slots 37 and 38 provide a means for guiding the upward and downward movement of said shields respectively and for holding said shields in adjacent vertical position during their described movement within the limits of said slots respectively.

It will be understood that the adjusting screw 29 may be selectively rotated downwardly to pre-set the arm 20 and its extensions 21 and 22 at the desired height relative to the work bed and relative to the driven saw, and that the lock nut 30 is adapted to be tightened to secure said set screw 29 in the desired preset position.

An important advantage and accomplishment of our described construction is the self-positioning and descent of the shorter forward shields or guards 31 and 34 to the extreme lowered position in contact with the upper face of the work bed immediately upon the work pieces being advanced to positions beyond the rear edges of said shorter guards to thereby form complete obstructions against accidental movement of the user's hands into contact with the rotating saw or cutters. This guarding and safety function is complete during the period of time that the other two longer guards 32 and 35 are partially upraised by sliding engagement of the work pieces thereunder, said longer guards 32 and 35 at the same time preventing a user from moving his hands into contact with the driven saw or cutter. It is to be understood that in absence of the separately pivoting shorter guards 31 and 34, a user would frequently retain his hand or fingers upon the work piece as it is advanced in the cutting operation, such retained hand at the same time acting to elevate the longer guards which would not obstruct the advancing movement of the user's hands.

A further advantage and accomplishment of our described construction is that complete visibility of the work piece and of the driven saw is fully maintained during the cutting operations regardless of the position of the user, said complete visibility being also partially accomplished by the upper transparent panel 24 as well as by the transparency of the respective pivoted shields described. Accordingly, these factors of complete continuing visibility and of the self-positioning, shorter hand-obstrucing guards 31 and 34, are especially important where machines of this type are used by students or by other persons of limited experience.

Our described construction of guards additionally provides a substantial enclosure of the area adjacent the driven saw or cutter so that sawdust, chips and dust thrown outwardly by the cutting operation will strike said shield and guards and drop downwardly and not be thrown upwardly into the operator's eyes to decrease or destroy his vision of the work pieces and of the driven saw or cutter. The said maintenance of clear visibility is an important safety factor and aids in preventing accidental movement of the hands into saw or cutter contacting positions.

In presently known guards on dado machines, their construction necessitates complete removal of such guards when cutters are removed or changed, whereas in contrast our improved guard and its described adjustable mounting is so constructed that no removal thereof is necessary in connection with dado machines and replacement and removal of cutters thereof.

While the foregoing specification sets forth the invention in specific terms, it is to be understood that numerous changes in the shape, size and materials may be resorted to without departing from the spirit and scope of the invention as claimed hereinafter and it is contemplated that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

We claim:

1. In an adjustable guard for power driven saws and cutters,
 an angularly bent elongated bracket adapted to be connected to a stationary portion of a power saw support and adapted to extend over said support;
 a supporting arm having one end portion adjustably secured to one end portion of said bracket and adapted to extend over the cutting area;
 a pair of transparent panel-like guards having beveled edges at the work piece entering direction and pivoted on the free end of said supporting arm;
 one of said guards being relatively shorter than the other guard;
 pivoting means on said arm for loosely pivoting said guards to said arm;
 means for guiding the independent pivoting movement of said guards;
 said foremost shorter guard being adapted to drop into lower shielding position when work pieces have progressed partially through the cutting operation and while said longer guard is upraised and partially shielding the moving cutting element.

2. In an adjustable guard for power driven saws and cutters,
 an angularly bent elongated bracket adapted to be connected to a stationary portion of a power saw support and adapted to extend over said support;
 a supporting arm having one end portion adjustably secured to one end portion of said bracket and adapted to extend over the cutting area;
 a transparent panel mounted on the end portion of said arm;
 a forward guard and a rearmost guard, each thereof having beveled edges and pivoted in adjacent relation respectively on each side of the free end of said supporting arm;
 the rearmost guard being relatively longer than the other foremost guard;
 pivoting means on said arm for loosely pivoting said guards on opposite sides of said arm;
 said foremost shorter guards being adapted to drop into lower shielding positions when work pieces have progressed partially through the cutting operation and while said longer rearmost guards are upraised and partially shielding the moving cutting element.

3. In an adjustable guard for power driven saws and cutters,
 an angular elongated bracket adapted to be connected to a stationary portion of a power saw support and adapted to extend over said support;
 a supporting arm having one end portion adjustably secured to one end portion of said bracket and adapted to extend over the cutting area;
 a plurality of transparent panel-like arcuately slotted guards having beveled edges at the work piece-entering direction and pivoted in upwardly extending planes on opposite sides of the free end of said supporting arm;
 pivoting means on said arm for loosely pivoting said guards to opposite side portions of said arm;
 means for guiding the independent pivoting movement of said guards having screws extending through said slots;
 said foremost shorter guards being adapted to drop into lower shielding positions when work pieces have progressed to disengage said shorter guards and while said longer guards are partially upraised and partially shielding the moving saw.

4. In adjustable guard means for power driven saws and cutters,
 a supporting arm having one end portion adapted to extend over the cutting area;
 means for adjustably mounting said arm;
 two pairs of transparent panel-like guards having beveled edges at the work piece entering direction and pivoted in spaced apart positions at one end of each thereof on the free end of said supporting arm two of said guards having portions extending forward beyond portions of the other two guards;
 pivoting means on said arm for loosely pivoting said guards to said arm;
 means for guiding the independent upward and downward pivoting movement of said guards;
 said foremost shorter guard being adapted to drop into lower shielding position when work pieces have progressed partially through the cutting operation and while said longer guard is partially upraised and partially shielding the driven saw.

5. In adjustable guard means for power driven saws and cutters,
 an angularly bent elongated bracket adapted to be connected to a stationary member and adapted to extend over said member;
 a supporting arm having one end portion adjustably secured to one end portion of said bracket and adapted to extend over the cutting area;
 a plurality of panel-like guards having beveled edges and pivoted in transversely spaced positions on the free end of said supporting arm;
 a part of said guards being relatively shorter than the other of said guards;
 pivoting means on said arm for pivoting said guards to said arm;
 said foremost shorter guards being adapted to drop into lower shielding position when work pieces have progressed partially through the cutting operation; said longer guard being upraised by work pieces and partially shielding the moving cutting element when said shorter guards have descended to lowermost position.

6. In an adjustable guard for power driven saws and cutters,
 an angularly bent elongated bracket adapted to be connected to a stationay portion of a power saw support and adapted to extend over said support;
 a supporting arm having one end portion adjustably secured to one end portion of said bracket and adapted to extend over the cutting area;
 an adjustable securing collar mounted on said bracket and engaging said supporting arm and adapted to hold said supporting arm in desired position;

a pair of panel-like shields pivoted on each side of the projecting free portion of said supporting arm, one of said shields being relatively shorter than the other of said shields;

pivoting means on said arm for loosely pivoting said shields on opposite sides of said arm;

said foremost shorter shields being adapted to drop into lower shielding positions when work pieces have progressed partially through the cutting operation and while said longer rearmost shields are upraised and partially shielding the moving cutting element.

7. Adjustable guard means for power driven cutters substantially as recited in claim 6 and wherein said supporting arm is bifurcated to provide two spaced apart extensions said guards being pivotally connected to said extensions.

8. An adjustable guard means for power driven saws and cutters as recited in claim 4, and having a transparent shield mounted on the upper part of said arm to provide full visibility of the saws and work pieces, said shield and said panel-like guards providing an enclosure about the cutting area to prevent outward projection of saw dust and chips.

References Cited by the Examiner
UNITED STATES PATENTS

| | | | |
|---|---|---|---|
| 1,465,224 | 8/1923 | Lantz | 143—159 |
| 2,007,887 | 7/1935 | Tautz | 143—159 |

WILLIAM W. DYER, Jr., *Primary Examiner.*

W. D. BRAY, *Assistant Examiner.*